United States Patent
Nugraha et al.

(10) Patent No.: US 12,292,531 B2
(45) Date of Patent: *May 6, 2025

(54) SYSTEMS, DEVICES, AND METHODS FOR REAL-TIME INTEFERENCE DETECTION

(71) Applicant: Infineon Technologies AG, Neubiberg (DE)

(72) Inventors: Dian Tresna Nugraha, Bandung (ID); Markus Bichl, Feldkirchen-Westerham (DE); Dyson Wilkes, Marlborough (GB)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,361

(22) Filed: Dec. 20, 2023

(65) Prior Publication Data
US 2024/0142572 A1 May 2, 2024

Related U.S. Application Data

(63) Continuation of application No. 17/374,048, filed on Jul. 13, 2021, now Pat. No. 11,906,654.

(30) Foreign Application Priority Data

Jul. 14, 2020 (DE) .................... 10 2020 118 540.5

(51) Int. Cl.
*G01S 7/40* (2006.01)
*G01S 7/02* (2006.01)
*G01S 7/292* (2006.01)

(52) U.S. Cl.
CPC ............ *G01S 7/4013* (2021.05); *G01S 7/023* (2013.01); *G01S 7/2927* (2013.01)

(58) Field of Classification Search
CPC ...... G01S 7/4013; G01S 7/023; G01S 7/2927; G01S 13/5246
See application file for complete search history.

(56) References Cited

U.S. PATENT DOCUMENTS

2010/0214157 A1  8/2010  McEwan
2015/0301172 A1  10/2015 Ossowska
(Continued)

FOREIGN PATENT DOCUMENTS

EP   3244229 A1    11/2017
JP   2007225602 A   9/2007
JP   2012519275 A   8/2012

OTHER PUBLICATIONS

Non-Final Office Action dated Mar. 28, 2023 for U.S. Appl. No. 17/374,048.
(Continued)

*Primary Examiner* — Bernarr E Gregory
*Assistant Examiner* — Juliana Cross
(74) *Attorney, Agent, or Firm* — Eschweiler & Potashnik, LLC

(57) ABSTRACT

Signal processing circuitry includes at least one processor configured to obtain a digitized radar signal, and further configured, for one or more iterations, to: determine a first power of at least one first signal sample of the radar signal; determine a second power of at least one second signal sample of the radar signal, the at least one second signal sample being subsequent in time to the at least one first signal sample; and determine a difference value between the second power and the first power. The at least one processor further configured to detecting a burst interference signal occurring within the radar signal based on the one or more difference values from the one or more iterations.

20 Claims, 8 Drawing Sheets

(56) References Cited

U.S. PATENT DOCUMENTS

2015/0331098 A1    11/2015  Luebbert
2017/0187418 A1*  6/2017  Dafesh ................. H04B 1/1027
2018/0356495 A1    12/2018  Moss
2020/0072941 A1*  3/2020  Jansen .................. G01S 13/343
2020/0191911 A1    6/2020  Meissner et al.

OTHER PUBLICATIONS

Final Office Action dated Aug. 9, 2023, for U.S. Appl. No. 17/374,048.

\* cited by examiner

500

```
function Det = interference_detector(Plin, Ns, param)

%% Power difference
Ld = zeros(Ns,1);
Ld(2:Ns) = abs(Pd(2:Ns) - Pd(1:(Ns-1)));

%% Collect positive and negative transitions above threshold
Tran = (Ld(1:Ns) > param.threshold);

%% Extend using sliding window
Det = false(Ns,1);
L = (param.windowSize);

for ix=1:Ns

% boundaries of the sliding window
    left = max(1,ix-L);
    right = min(Ns,ix+L);

% thresholding with population count
    population = sum(Tran(left:right));
    Det(ix) = population > param.pcThreshold;
end
```

```
> HPF model (1st order)

function y = highpass(y, x, Ns)
    alp = 0.9; % tunable for the cut-off freq.
    y(1) = 0;
    for n=2:Ns
        y(n) = alp * (y(n-1) + (x(n)) - (x(n-1)));
    end
end
```

FIG. 7

SYSTEMS, DEVICES, AND METHODS FOR REAL-TIME INTEFERENCE DETECTION

REFERENCE TO RELATED APPLICATION

This application is a continuation of U.S. application Ser. No. 17/374,048, filed on Jul. 13, 2021, now U.S. Pat. No. 11,906,654, which claims priority to German Application No. 10 2020 118 540.5, filed on Jul. 14, 2020, the contents of which are hereby incorporated by reference in their entirety.

TECHNICAL FIELD

Various embodiments relate generally to interference detectors.

BACKGROUND

Signals, such as, radar signals, communication signals, etc. can experience undesired burst interference. Some approaches, which can include establishing a threshold for comparison for detecting the presence of interference within a desired signal, may be suitable when the interference causes a large change in power.

However, such approaches, including ones that use cell-averaging (CA) techniques, may be deficient or inadequate as they may improperly detect interference for too short of a window period or may improperly detect interference for too long of a window period. Further, such approaches may falsely detect interference when the burst interference has a low amplitude. Other problematic scenarios for previous approaches are ones in which an obtained or desired signal has a low frequency component because interference may be falsely detected or interference may fail to be detected. In addition, the approaches may include buffering signals which will cause unwanted delays.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the described embodiments. In the following description, various embodiments of the disclosure are described with reference to the following drawings, in which:

FIG. 5 shows exemplary code which may be implemented according to at least one exemplary embodiment of the present disclosure;

FIG. 7 shows exemplary code which may be implemented according to at least one exemplary embodiment of the present disclosure.

DESCRIPTION

Figure 1:
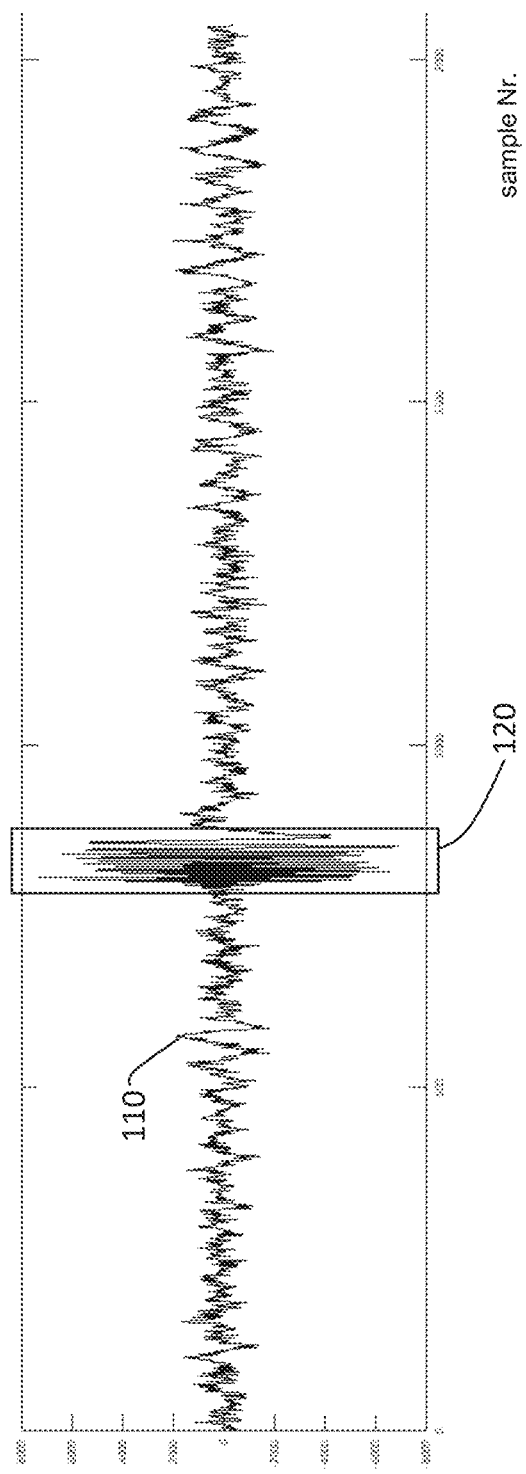
FIG. 1 shows a graph of a signal experiencing interference.

The following detailed description refers to the accompanying drawings that show, by way of illustration, specific details and embodiments which may be practiced.

Throughout the drawings, it should be noted that like reference numbers are used to depict the same or similar elements, features, and structures.

The word "exemplary" is used herein to mean "serving as an example, instance, or illustration". Any embodiment or design described herein as "exemplary" is not necessarily to be construed as preferred or advantageous over other embodiments or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical or electronic components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computer Unit (NCU), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Various embodiments of the present disclosure relate to systems, devices, and/or methods for detecting or handling burst interference. As mentioned burst interference may occur in a radar system, in a communication system, or other systems.

FIG. 1 is graph showing a signal 110 experiencing burst interference. The interference window 120 identifies the portion of the signal 110 experiencing the burst interference. The signal 110 may be a digital signal produced or outputted from an analog-to-digital converter (ADC) device. The signal 110, before digitized, may have been a RF signal, a radar signal (e.g., continuous wave such as FM-CW radar signal) or any other type of analog signal.

Figure 2:
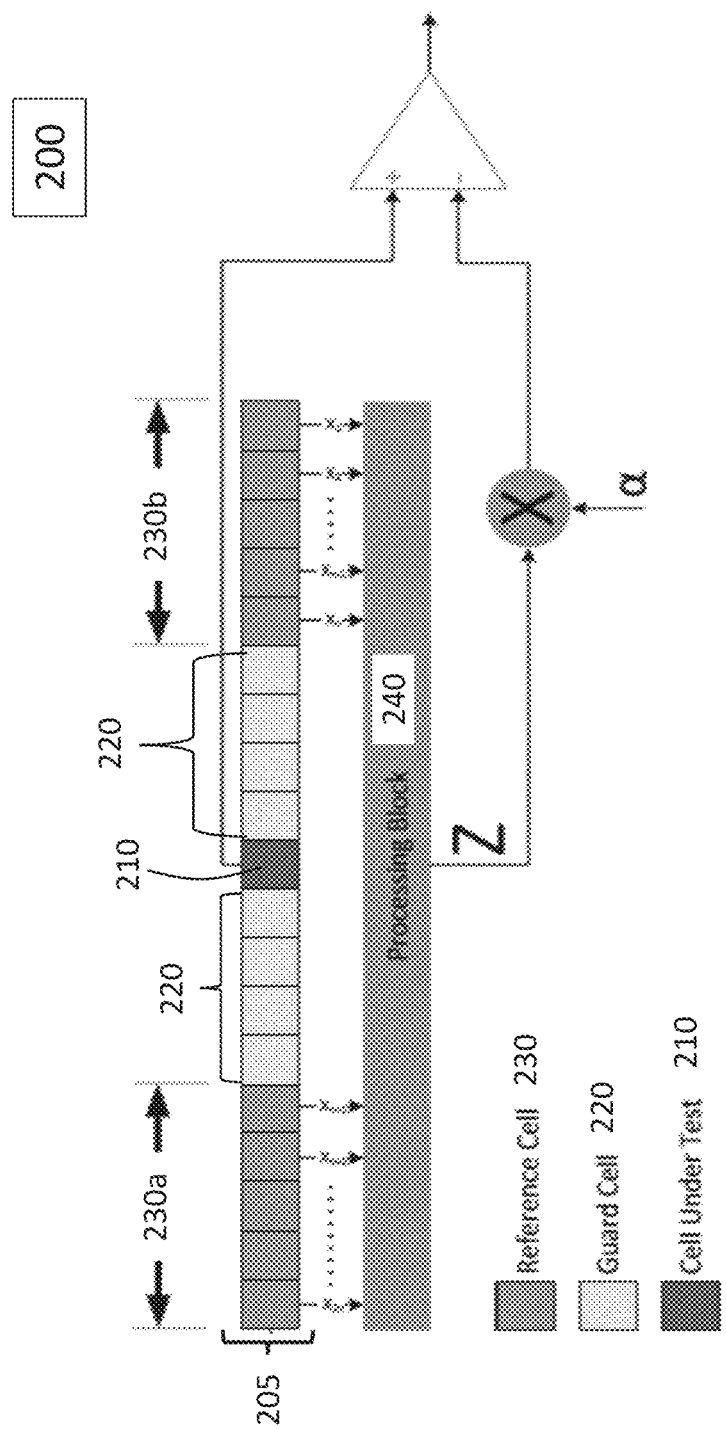
FIG. 2 shows an exemplary Constant False Alarm Rate (CFAR) detection device.

FIG. 2 shows architecture for a Constant False Alarm Rate (CFAR) detection device 200, that can be used in detecting interference. The CFAR 200 processes a signal 205 which can include samples or cells that can be indexed by time. CFARs, such as the CFAR 200, may implement various types of detection schemes, including ones involving comparing determined power levels from a cell or cells under test (CUT) 210 with a threshold. Such a threshold may be predefined (e.g., have a constant value) or can be dynamically established or calculated from power levels of reference cells 230, e.g., cells neighboring or surrounding the cell-under-test (CUT). The reference cells 230 may be separated from the CUT 210 by guard cells 220. The reference cells 230 can include lagging (230a) or leading (230b) cells. If the CUT power level is above the determined or established threshold, then a target or interference may be considered detected in the CUT.

For example, in FIG. 2, the CFAR 200 may execute a type of cell-averaging (CA) scheme, CASUM, in which the determined power levels of the reference cells 230 surrounding the CUT 210 are averaged together by a processing block 240. The processing block 240 can include processing circuitry (e.g., processors or any suitable signal processing circuitry).

The determined result (Z) may then be multiplied by a value (alpha or a) which can produce or generate a threshold (Y). In other cases, instead of multiplying the result Z by a value $\alpha$, the processing block 240 may calculate or determine the threshold Y by adding the logarithm of Z (e.g., $\log_2(Z)$) to the logarithm of a (e.g., $\log_2(\alpha)$).

The CUT 210 is compared against the determined threshold, e.g., by suitable means (e.g., a comparator circuit, one or more processors, or other suitable circuitry). Interference is considered present if the power level of the CUT 210 is determined to be more than or above the determined threshold. The CFAR 200 can be further configured to output a signal to indicate the presence of detected interference in samples. This comparison is done repeatedly or iteratively over a range of cells of the input signal.

Detection schemes implemented by a CFAR include various ways or methods for establishing or determining a threshold value for used in a comparison with a CUT. One example is cell-averaging greatest (CAGO), in which each set or group of references cells (e.g., the leading and lagging reference cells) for a respective CUT are separately or individually averaged. The greatest average from these two different averages is used for calculating or determining (e.g., multiplying by $\alpha$) the threshold.

Similarly, a cell-averaging smallest (CASO) approach can also be used. The CASO is like CAGO except that the smallest of the averages (e.g., from the leading and lagging reference cells) is used (e.g., multiplied by $\alpha$) for establishing a threshold. Other techniques include using other types of statistical analyses, which may be referred to as generalized ordered statistics (GOS), which can also be applied to the references cells collectively (GOSSUM) or can be applied individually or separately to the sets of references cells. Further, in a GOS approach, the greatest power value (GOSGO) or the smallest power value (GOSSO) can also be used for determining a threshold or threshold value.

For implementation of these techniques, parameters, such as the amount of reference cells (both leading and lagging reference cells), amount of guard cells, the alpha value, and other related parameters may be ascertained prior.

The above-identified techniques have disadvantages. For example, low-amplitude bursts can cause difficulty in setting a proper alpha value ($\alpha$) which can lead to false detections, particularly at locations of the signal just outside of the actual interference burst period. High-amplitude bursts can also be problematic as some techniques, such as CASO or GOSSO, may only detect interference within too tight or short of a window and thus miss or fail to detect some of the burst interference.

Further, in cases where a signal experiencing interference has a low frequency component (e.g., near DC), some techniques may falsely detect interference in locations of the signal just outside where the actually interference burst occurs. Further, the above described techniques can also fail to detect some instances of actual interference.

Exemplary interference detectors presented herein are designed to address the shortcomings of the above-described detectors and detection methods.

Figure 3:
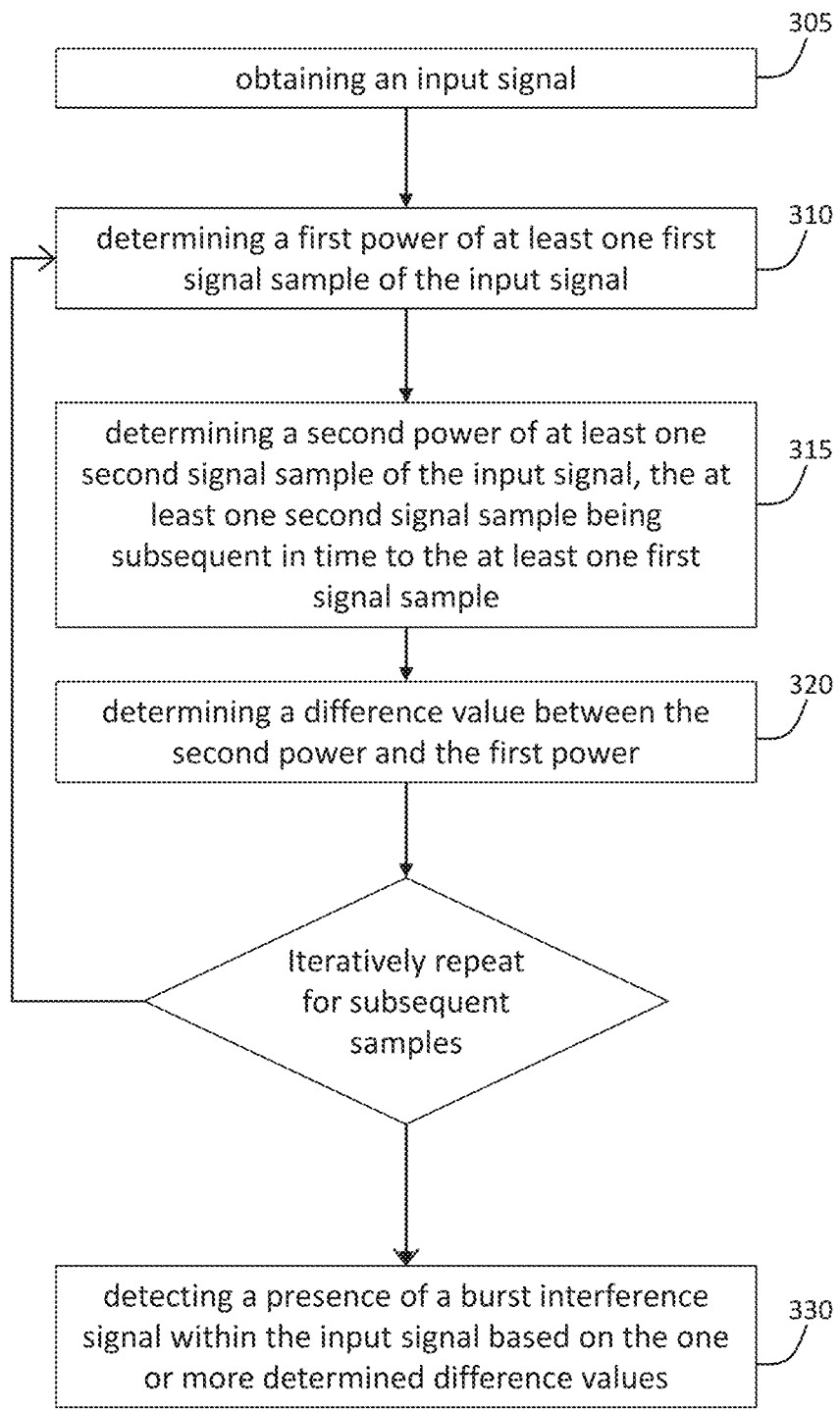
FIG. 3 a method interference detection according to at least one exemplary embodiment of the present disclosure.

In accordance with exemplary embodiments of the present disclosure, FIG. 3 shows an exemplary method for detecting interference. The method of FIG. 3, may be realized or implemented by a CFAR device, including a CFAR device having the same or similar architecture as the CFAR 200. The CFAR 200 may include one or more processors (e.g., signal processing circuitry or like electronic components) which can be used to implement a method such as the one of FIG. 3.

The method of FIG. 3 includes at 305, obtaining a signal. The signal may be a digital signal including a plurality of signal samples, e.g., that may be indexed by time. The signal may be a digitized version of a radio frequency (RF) signal, radar signal (e.g., continuous wave radar), audio, or any other suitable type of signal. Further the signal may be a real or complex signal which can include for example an IQ signal (including in-phase and quadrature). In one example, a radar signal may be represented. as IQ signal, or in terms of its in-phase and quadrature components, e.g., after demodulation. Further, the signal may also be an audio signal, for example, an audio signal obtained from any suitable source, including one obtained from a vinyl record during record playback in one example.

The method may include repeatedly or iteratively performing at least a portion of the method, specifically parts 310-320. At 310, the method includes determining a first power of at least one first signal sample of the signal. That is, the power of a first selection of one or more first samples or cells of the signal may be determined or calculated. At 315, the method includes determining a second power of at least one second signal sample of the signal, the at least one second signal sample being subsequent in time to the at least one first signal sample. At 320, the method includes determining a difference between the determined second power and the determined first power.

As previously disclosed, the method of FIG. 3 may include repeatedly performing 310-320. The number or iterations or repetitions may be predefined or may continue as long there are samples or cells of the signal for detection. Each iteration can be performed for a subsequent or later portion or sample of the signal. For example, for 310, the at least one first signal sample can be one or more samples that are subsequent in time to or occurring after the at least one first signal sample of the previous iteration. Similarly, for step 315, the at least one second signal sample is one or more samples that are subsequent in time to or occurring after the at least one second signal sample of the previous iteration.

In one example, for each iteration, the at least one first signal sample may be a single individual signal sample (a first single sample) and the at least one second signal sample may also be a single individual sample that occurs in time after the first sample (a second single sample). In some cases, the second single sample may the signal sample occurring immediately after or successive to the first single sample. In other situations, the second single sample may be separated by one or more signal samples from the first signal sample for a given iteration.

In one or more examples, processing or sliding windows may be used in determining power values from input samples. For example, first powers may be determined from one or more samples or cells of the signal that are located within a first processing window of the input signal (the at least one first signal sample). The first processing window can advance or slide to select subsequent samples for each additional determination of a first power, or advance in the signal for each iteration. Further, the determination of at least one second signal sample of the input or obtained signal may similarly use a second processing window to select one or more samples from the signal. The second processing window can include one or more samples of the input signal with at least one of the signal samples of this second window being subsequent (e.g., in time) to all of the signal samples of the first processing window. The second processing window, like the first processing window, can advance or slide for each iteration to select subsequent samples for each determination of a second power.

As a result of iteratively or repeatedly performing 310-320 for a series of subsequent or successive (in time) CUTs, a number or plurality of difference values or power difference values is produced or generated. These difference values or local power differences that are generated provide an estimate of the rate of change of power of the input signal.

As shown, in FIG. 3, the method further includes at 330, detecting a presence of a burst interference signal within the signal based on or using the one or more determined difference values. That is, the difference values, or portions thereof, can be used to detect occurrence of burst interference within the obtained signal.

Determining or detecting burst interference can include determining whether each of the power difference values is greater than a first threshold or first threshold value. Said differently, determinations can be made whether each difference value is greater than the first threshold. This first threshold may be predefined or predetermined, or may be set, e.g., by a user. In other cases, the first threshold may be dynamically set or determined, e.g., based on input or certain feedback.

For detecting interference, a population count can be implemented on or using the results of the determinations or comparisons of the difference values against a first threshold. That is, for each of one or more signal samples being considered, an interference detector can implement a population count mechanism. The population count mechanism can determine a quantity representing a number of difference values that exceeds the first threshold and determine or evaluate whether that quantity is greater than a second threshold. If the quantity if greater than the second threshold, then burst interference can be considered as detected for the corresponding input signal.

The quantity or number produced by the population count mechanism can be determined or evaluated from the results of determinations or comparisons made for a selected group of difference value(s) against the first threshold. The selected group of difference value(s) which can correspond to a particular population count can be chosen using a sliding window technique. The sliding window can advance or slide for each subsequent input sample being considered or evaluated for interference.

The method of FIG. 3 can further include outputting a signal indicating the particular sample signals for which the presence of interference has been detected or determined.

The local power differences or difference values obtained from a signal can provide an estimate of the rate of change of the power of the signal. Some valid signals (e.g., signals without interference) may have an instantaneous rate of change that exceeds a defined threshold. By contrast, interference generally will have increased rate of change over a longer period, e.g., more than one or two samples. However burst interference, for example, can in at least some instances have a rate of change that is lower than a defined threshold. Therefore using a population count over a sliding window on the first threshold determination outputs can be used to eliminate both spurious detection and gaps in the interference detection. The threshold for the population count (e.g., second threshold) may be modified or tuned depending on determined conditions in the environment in which the signal exists.

Figure 4:
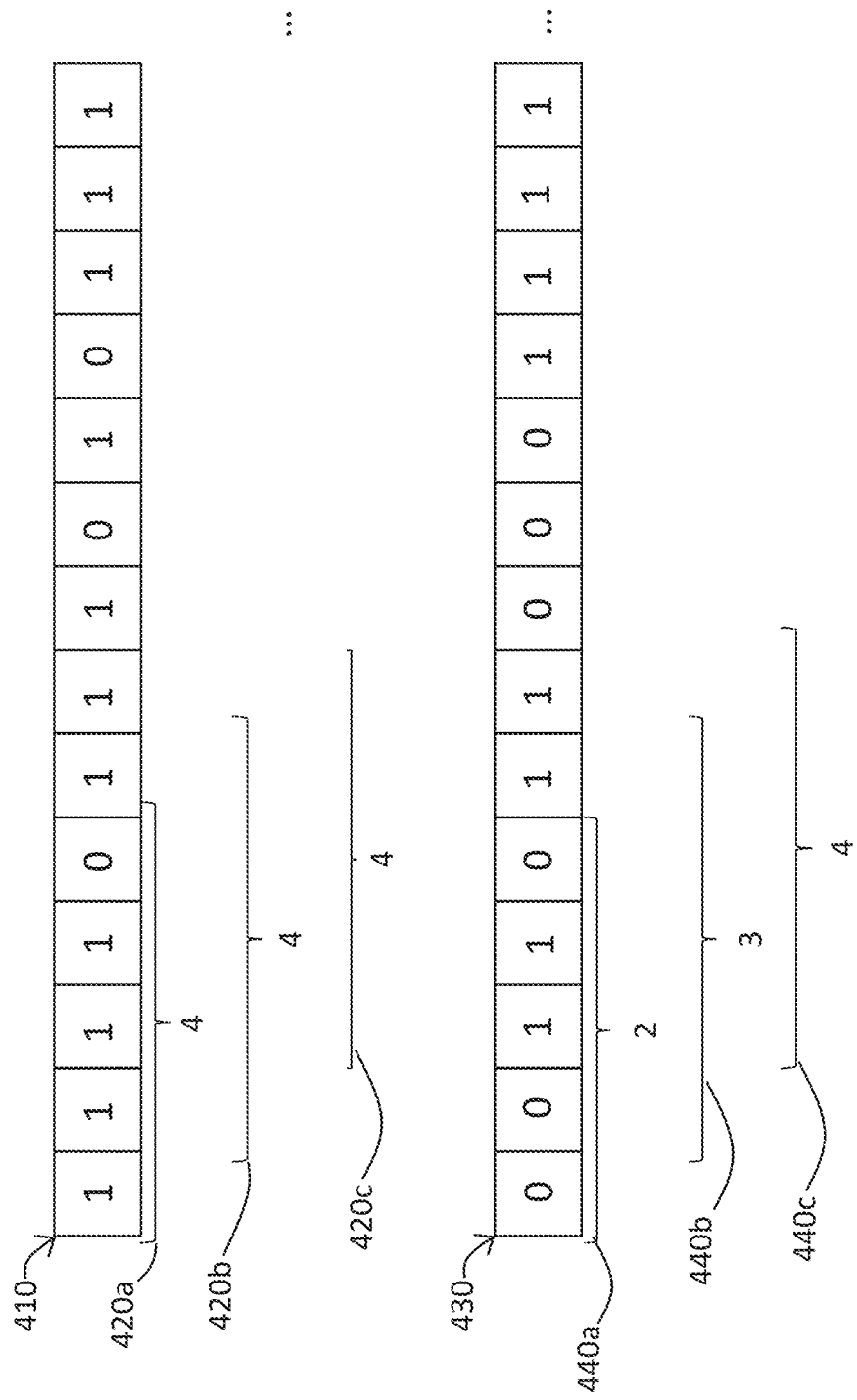
FIG. 4 shows representation of exemplary data according to at least one exemplary embodiment of the present disclosure.

FIG. 4 shows exemplary output for the first threshold determination described above. Each entry or datum of the data 410 and 430 may represent the result of a determination of whether an individual determined difference power value exceeds a (first) threshold. The data 410 can be generated from difference (power) values from a first signal and the data 430 can be generated from difference (power) values from a second signal. In this example, a "1" represents a calculated difference value exceeding the (first) threshold while a "0" represents a difference value not exceeding the (first) threshold value. Using such data, a population count mechanism can be implemented to determine the presence of burst interference. The population count can be implemented using a sliding window technique to determine the number or quantity of determined difference values located within a window (of a predefined size or length) that exceeds a second threshold.

In the example of FIG. 4, a sliding window of size or length five (5) is used for the population count mechanism. Accordingly, in this example, a burst signal interference may be detected within the signal or signal sample if the corresponding number of difference values exceeding the first threshold and located within each window exceeds a (second) threshold of three (3). In some cases, such as in FIG. 4, the population count for each window instance may be determined by summing the ones ("1"s) at each window instance (e.g., 420a, 420b, 420c, . . . ). Therefore, for the first data stream 410, the threshold of three is at least exceeded at window instances 420a, 420b, 420c, which each have a population count of four (4). In other cases, the value of (second) threshold used for the population count can vary and in some examples the threshold can have a value as low as one (1) for determining or detecting the presence or occurrence of interference.

In FIG. 4, the portion or sample(s) of the input signal corresponding to the to the window instances 420a, 420b, and 420c can be considered as experiencing interference. For the data 430, the population count at window instances 440a, 440b, and 440c is respectively 2, 3, and 4. Therefore, the portion of the input signal corresponding to window 440c can be considered as experiencing burst interference but not the portion of the signal corresponding to window instances 440a and 440b. In various examples, the sample or portion signal corresponding to a determined population count may be the particular portion or sample of the signal that corresponds to a difference value located in the middle of a sliding window instance.

FIG. 5 shows exemplary or pseudo code 500 for implementing a difference power value determination for an input signal and a population count mechanism for a given input. In this example, Plin indicates or is the power of the sampled input sample, Ns is the number of samples in Plin, param-.threshold is the first threshold or power threshold, and param.pcThreshold is the population count threshold.

Figure 6:
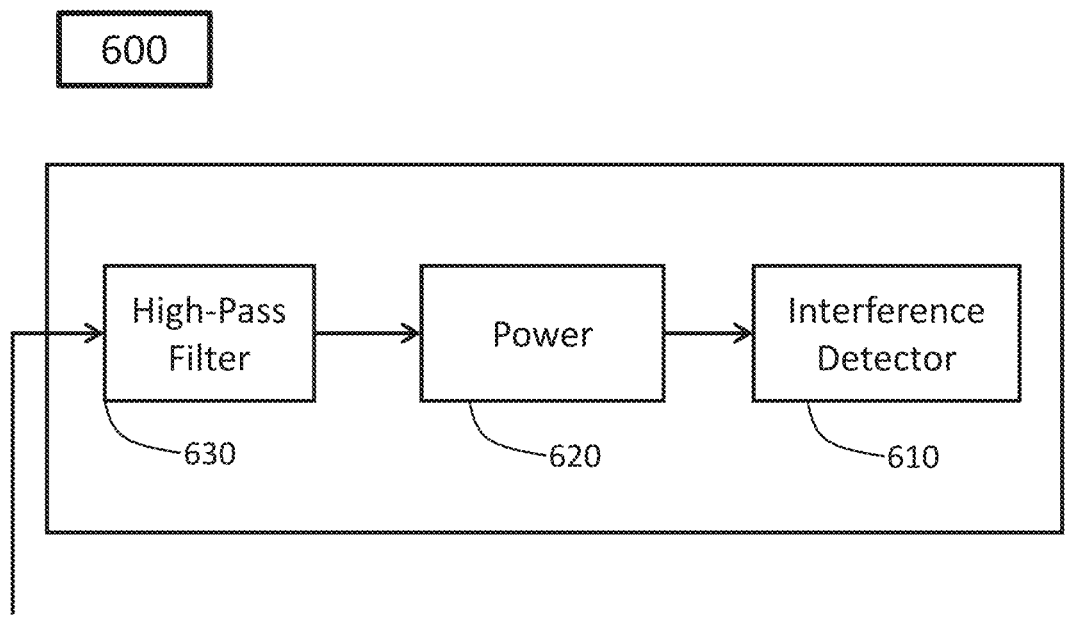
FIG. 6 shows an exemplary system according to at least one exemplary embodiment of the present disclosure.

FIG. 6 shows an exemplary interference detection system according to at least one exemplary embodiment of the present disclosure. The interference detection system 600 may include an interference detector 610. The interference detector 610 might have an architecture that is the same or similar to the architecture of FIG. 2 and can implements a method such as or similar to the methods described in connection with FIG. 3. That is, the interference detector 610 can be designed to implement determining difference power values from samples of an input signal and determining interference based on the value of difference values compared to a threshold (e.g., using a population count mechanism). In an embodiment, the threshold value used in the interference detector 610 can be configured.

In addition, the system 600 can include a high-pass filter 630 and a power calculation component 620. For example, the power calculation component 620 can be circuitry configured to calculate power from a real or complex input. (The calculation can be implemented, for example, as $x^2$ for a real signal or $|x|^2$ for complex signal). In the example of FIG. 6, an input or obtained signal (which may or may not have been processed) may be filtered by the high-pass filter 630. If the high-pass filter 630, the power calculation component 620, and the interference detector 610 are implemented as hardware modules, the processing speed can be substantially increased.

The interference detectors described above improve the detection of interference bursts where their amplitude is relatively low compared to the amplitude of the useful signal. To further improve interference detection performance for input signals that experience burst interference while the signal itself undergoes a gradual or continually changing amplitude (e.g. caused by low-frequency content), the system of FIG. 6 includes the high-pass filter 630. The high-pass filter can reduce or remove any low frequency components from the signal that could cause interference to be missed by a detector.

In general, the high-pass filter 630 may be implemented digitally. In some cases, the high-pass filter may be implemented in the analog domain (e.g., before or after the input signal has been digitized).

FIG. 7 shows pseudo code or exemplary code 700 for implementing an exemplary first order high-pass filter which may be used for the high-pass filter 630. However, other types or kinds of digital filters, including higher order high-pass filters, may be implemented or used for the high-pass filter 630. Digital filters may be implemented by at least one circuit or signal processor, such as the one or more processors that may be part of the interference detector 610.

Figure 8:
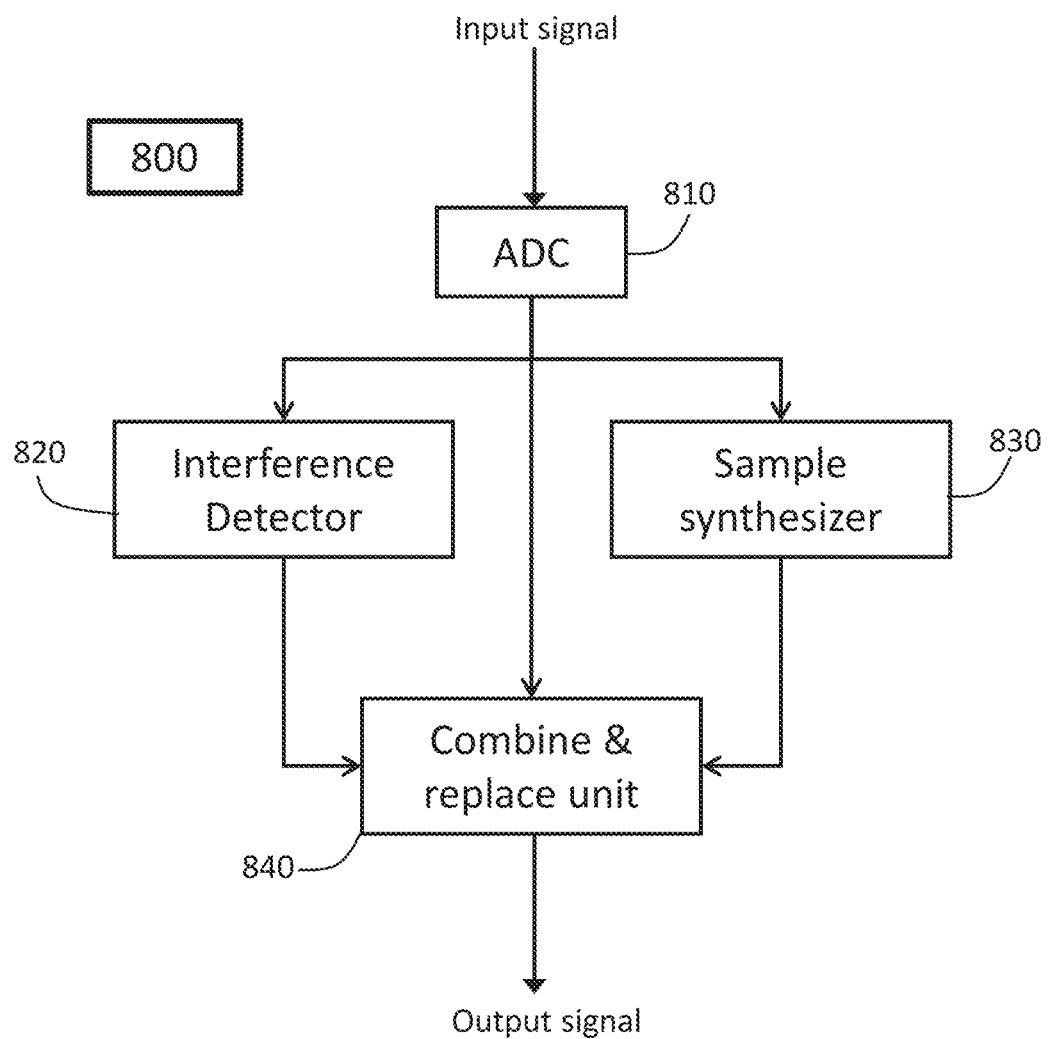
FIG. 8 shows an exemplary system according to at least one exemplary embodiment of the present disclosure.

FIG. 8 shows an exemplary system according to at least one embodiment of the present disclosure. The system 800 may be used for handling, removing or reducing interference in an obtained or received signal. In this example, the signal or input signal can be any type of analog signal (e.g., RF or radar signal). The signal can first be input to an analog-to-digital converter (ADC) 810 that digitizes the signal. The digital signal produced by the ADC 810 can be sent or forwarded as input to various other components of the system 800. As shown, the digital signal is input to the interference detector 820, the sample synthesizer 830, and the combine and replace unit 840.

The interference detector 820 may be an interference detector described above in connection with FIG. 3. Further the interference detector 820 may also be realized as or similar to the interference detection system 600.

The system 800 includes a sample synthesizer 830. The sample synthesizer 830 may be any suitable device or circuit (e.g., including a processor) that synthesizes or produces samples based on the digital signal received or obtained from the ADC 810. The sample synthesizer 830 may synthesize input signal samples based on all or a subset of the digital signal samples input from the ADC.

The system further includes a combine and replace unit 840. The combine and replace unit 840 can obtain or receive as input, the outputs of the ADC 810, the interference detector 820, and the sample synthesizer 830. The combine and replace unit 840 can be configured to selectively modify the digital signal received from the ADC 810. That is, the combine and replace unit 840 can replace samples of the signal received from the ADC 810 with the corresponding samples produced or synthesized by the synthesizer 830 based on or in response to an indication of the received output signal of the interference detector 820. The combine and replace unit 840 replaces the samples of the input signal indicated as experiencing interference by the interference detector 820 with the corresponding or parallel generated signal samples from the sample synthesizer 830. The combine and replace unit 840 outputs this modified signal or reconstituted signal.

The combine and replace unit 840 can be implemented by any suitable circuit(s), including a processor. Further, the various components of the system 800 may be implemented together or as separate circuits. The system 800 may be able to produce an output signal in real-time or near real-time. That is, the use of buffers in the system 800 can be avoided.

The following examples pertain to further exemplary implementations.

Example 1 is a signal processing circuitry, including: one or more processors, the one or more processors is configured, for one or more iterations, to: determine a first power of at least one first signal sample of a radar signal, the at least one first signal of the radar signal being within a first processing window of the radar signal, the first processing window comprising one or more samples of the radar signal; determine a second power of at least one second signal sample of the radar signal, the at least one second signal sample being within a second processing window of the radar signal, the second processing window comprising one or more samples of the radar signal with at least one of the one or more signal samples of the second window being subsequent in time to all signal samples of the first processing window; determine a difference value between the second power and the first power; wherein the one or more processors are further configured to detect a burst interference signal occurrence within the radar signal using the one or more difference values from all of the one or more iterations.

Example 2 is the subject matter of Example 1, wherein the one or more processors configured to detect the burst interference signal comprises the one or more processors may be configured to: determine a quantity indicating a number of the one or more difference values that exceed a first threshold, and determine whether the quantity exceeds a second threshold to detect the occurrence the burst interference signal within the radar signal.

Example 3 is the subject matter of Example 2 wherein the one or more processors dynamically define the first threshold and/or the second threshold.

Example 4 is the subject matter of Example 2 wherein the first threshold and/or the second threshold are predefined.

Example 5 is the subject matter of any of Examples 1 to 4, which may further include: a high-pass filter configured to filter the radar signal.

Example 6 is the subject matter of any of Examples 1 to 5, wherein the radar signal may be a digitized radio frequency (RF) signal.

Example 7 is the subject matter of any of Examples 1 to 6, wherein the at least one first signal sample of each iteration may be a single signal sample and wherein the at least one second signal sample of each iteration may be a single signal sample.

Example 8 is the subject matter of Example 7, wherein for at least one of the iterations, the second signal sample is a sample immediately successive to the first signal sample.

Example 9 is the subject matter of any of Examples 1 to 8, wherein the one or more iterations can include a plurality of iterations, and wherein for each second or later iteration, the at least one first signal of the radar signal can be subsequent in time to the at least one first signal of the radar signal of the previous iteration and/or the at least one second signal of the radar signal is subsequent in time to the at least one second signal of the radar signal of the previous iteration.

Example 10 is the subject matter of any of Examples 1 to 9, wherein a number of the one or more iterations may predefined.

Example 11 is a method for processing a digitized radar signal, the method including: obtaining a radar signal; wherein for one or more iterations, the method further includes determining a first power of at least one first signal sample of the radar signal; determining a second power of at least one second signal sample of the radar signal, the second signal sample being subsequent in time to the at least one first signal sample; and determining a difference value between the second power and the first power; and wherein the method further includes detecting a burst interference signal occurs within the radar signal based on the one or more difference values from all of the one or more iterations.

Example 12 is the subject matter of Example 11, wherein detecting the burst interference signal occurrence within the radar signal may further include: determining a quantity indicating a number of the one or more difference values that exceed a first threshold, and determining whether the quantity exceeds a second threshold for detecting that the burst interference signal occurred within the radar signal.

Example 13 is the subject matter of Example 12 which may further include setting the first threshold and/or the second threshold.

Example 14 is the subject matter of Example 12 wherein the first threshold and/or the second threshold are predefined.

Example 15 is the subject matter of any of Examples 11 to 14 which may further include: applying a high-pass filter to a first radar signal, wherein obtaining the radar signal obtaining the first radar signal after application of the high-pass filter.

Example 16 is the subject matter of any of Examples 11 to 15, wherein the radar signal may be a digitized radio frequency (RF) signal.

Example 17 is the subject matter of any of Examples 11 to 16, wherein the at least one first signal sample of each iteration may be a single sample and wherein the at least one second signal sample of each iteration may be a single sample.

Example 18 is the subject matter of Example 17, wherein for at least one of the iterations, the second signal sample may be a signal sample immediately successive to the first signal sample.

Example 19 is the subject matter of any of Examples 11 to 18, wherein the one or more iterations can be a plurality of iterations, and wherein for each second or later iteration, the at least one first signal of the radar signal is subsequent in time to the at least one first signal of the radar signal of the previous iteration and/or the at least one second signal of the radar signal is subsequent in time to the at least one second signal of the radar signal of the previous iteration.

Example 20 is the subject matter of any of Examples 11 to 19, the method may further include setting a number of the one or more iterations.

Example 21 is a non-transitory computer-readable medium containing instructions that when executed by at least one processor, cause the at least one processor to: for one or more iterations: determine a first power of at least one first signal sample of a radar signal, the at least one first signal of the radar signal being within a first processing window of the radar signal, the first processing window comprising one or more samples or the radar signal; determine a second power of at least one second signal sample of the radar signal, the at least one second signal sample being within a second processing window of the radar signal, the second processing window comprising one or more samples of the radar signal with at least one of the one or more signal samples of the second window being subsequent in time to all signal samples of the first processing window determine a difference value between the second power and the first power; wherein the instructions, when executed, further cause the at least one processor to further detect a burst interference signal occurs within the radar signal using the one or more difference values from all of the one or more iterations.

Example 22 is the subject matter of Example 21, wherein the at least one processor to detect the burst interference signal comprises the at least one processor to: determine a quantity indicating a number of the one or more difference values that exceed a first threshold, and determine whether the quantity exceeds a second threshold to detect the occurrence the burst interference signal within the radar signal.

Example 23 is a device including an interference detector comprising signal processing circuitry that further includes: one or more processors configured, for one or more iterations, to: determine a first power of at least one first signal sample of a radar signal, the at least one first signal of the radar signal being within a first processing window of the radar signal, the first processing window comprising one or more samples or the radar signal; determine a second power of at least one second signal sample of the radar signal, the at least one second signal sample being within a second processing window of the radar signal, the second processing window comprising one or more samples of the radar signal with at least one of the one or more signal samples of the second window being subsequent in time to all signal samples of the first processing window determine a difference value between the second power and the first power; wherein the one or more processors are further configured to detect a burst interference signal occurs within the radar signal using the one or more difference values from all of the one or more iterations; wherein the system further includes a sample synthesizer configured to synthesize from the radar signal one or more synthesized samples; and a combine and replace circuit configured to, in response to interference detector detecting a burst interference signal occurring within the radar signal, replace the one or more interfered samples with the respective synthesized samples to produce a modified radar signal.

Example 24 is the device of claim 23, which may further include an analog-to-digital (ADC) converter configured to receive a first analog radar signal and to provide the radar signal to the one or more processors as a digital signal.

Example 25 is signal processing circuitry including: at least one processor configured to obtain a digitized radar signal, and further configured, for one or more iterations, to: determine a first power of at least one first signal sample of the radar signal; determine a second power of at least one second signal sample of the radar signal, the second signal sample being subsequent in time to the at least one first signal sample; and determine a difference value between the second power and the first power; and wherein the at least one processor further configured to detecting a burst interference signal occurring within the radar signal based on the one or more difference values from all of the one or more iterations.

Example 26 is the subject matter of Example 25, wherein the at least one processor configured to detect the burst interference signal may include the at least one processor to: determine a quantity indicating a number of the one or more difference values that exceed a first threshold, and determine whether the quantity exceeds a second threshold to detect the occurrence the burst interference signal within the radar signal.

The above examples may be combined together or with other aspects of the disclosure.

While the disclosure has been described with reference to specific embodiments, it should be understood by those skilled in the art that various changes in form and detail may be made therein without departing from the spirit and scope of the disclosure as defined by the appended claims. The scope of the discourse is thus indicated by the appended claims and all changes which come within the meaning and range of equivalency of the claims are therefore intended to be embraced.

What is claimed is:
1. A device comprising:
   a high-pass filter configured to:
      receive a first sample and a second sample of a radar signal, the second sample being subsequent in time to the first sample;
      generate a first filtered sample based on the first sample and a cut-off frequency; and
      generate a second filtered sample based on the second sample and the cut-off frequency;
   power calculation circuitry configured to:
      receive the first filtered sample and the second filtered sample;
      calculate a power of the first filtered sample; and
      calculate a power of the second filtered sample; and
   an interference detector configured to:

receive the power of the first filtered sample and the power of the second filtered sample;
determine a first value indicating a difference between the power of the second filtered sample and the power of the first filtered sample;
determine whether the first value exceeds a first non-zero threshold; and
detect a burst interference signal occurrence within the radar signal based on whether the first value exceeds the first non-zero threshold.

2. The device of claim 1, wherein the second sample is immediately subsequent to the first sample, and wherein the high-pass filter is configured to generate the second filtered sample based on the cut-off frequency, the first filtered sample, the second sample, and the first sample.

3. The device of claim 2, wherein the high-pass filter is configured to generate the second filtered sample based on multiplying a value corresponding to the cut-off frequency by a sum of the first filtered sample and a difference of the second sample and the first sample.

4. The device of claim 1, wherein the cut-off frequency of the high-pass filter is tunable.

5. The device of claim 1, wherein the interference detector is configured to set the first non-zero threshold based on the power of the first filtered sample and the power of the second filtered sample.

6. The device of claim 1, the high-pass filter further configured to:
receive a third sample and a fourth sample of the radar signal, the fourth sample being subsequent in time to the third sample;
generate a third filtered sample based on the third sample and the cut-off frequency; and
generate a fourth filtered sample based on the fourth sample and the cut-off frequency;
the power calculation circuitry further configured to:
receive the third filtered sample and the fourth filtered sample;
calculate a power of the third filtered sample; and
calculate a power of the fourth filtered sample;
the interference detector further configured to:
receive the power of the third filtered sample and the power of the fourth filtered sample;
determine a second value indicating a difference between the power of the fourth filtered sample and the power of the third filtered sample;
determine whether the second value exceeds the first non-zero threshold;
determine a quantity indicating how many of the first value and the second value exceed the first non-zero threshold;
determine whether the quantity exceeds a second threshold; and
detect a burst interference signal occurrence within the radar signal based on whether the quantity exceeds the second threshold.

7. The device of claim 6, wherein the third sample is subsequent in time to the first sample, the second sample is subsequent in time to the third sample, and the fourth sample is subsequent in time to the second sample.

8. The device of claim 6, wherein the interference detector is configured to set the second threshold based on the environment in which the radar signal exists.

9. The device of claim 1, further comprising:
an analog-to-digital converter (ADC) configured to:
receive the radar signal;
generate the first sample and the second sample from the radar signal; and
provide the first sample and the second sample to the high-pass filter.

10. The device of claim 9, further comprising:
a sample synthesizer configured to generate a synthesized sample based on the first sample of the radar signal; and
a combine and replace circuit configured to replace the second sample of the radar signal with the synthesized sample in response to the interference detector detecting that the second sample experienced a burst interference signal occurrence.

11. A method comprising:
generating a first filtered sample based on a first sample of a radar signal and a cut-off frequency of a high-pass filter;
generating a second filtered sample based on a second sample of the radar signal and the cut-off frequency of the high-pass filter, the second sample being subsequent in time to the first sample;
determining a power of the first filtered sample;
determining a power of the second filtered sample;
determining a first value indicating a difference between the power of the second filtered sample and the power of the first filtered sample;
determining whether the first value exceeds a first non-zero threshold; and
detecting a burst interference signal occurrence within the radar signal based on whether the first value exceeds the first non-zero threshold.

12. The method of claim 11, wherein the second sample is immediately subsequent to the first sample, and wherein the second filtered sample is generated based on the cut-off frequency, the first filtered sample, the second sample, and the first sample.

13. The method of claim 11, wherein the first non-zero threshold is set based on the power of the first filtered sample, the power of the second filtered sample, and a power of a third filtered sample.

14. The method of claim 11, further comprising:
generating a synthesized sample based on the second sample of the radar signal and a third sample of the radar signal, the first sample being subsequent in time to the third sample; and
replacing the first sample of the radar signal with the synthesized sample in response to the first value exceeding the first non-zero threshold.

15. The method of claim 11, further comprising:
generating a third filtered sample based on a third sample of the radar signal and the cut-off frequency;
generating a fourth filtered sample based on a fourth sample of the radar signal and the cut-off frequency, the fourth filtered sample being subsequent in time to the third filtered sample;
determining a power of the third filtered sample and a power of the fourth filtered sample;
determining a second value indicating a difference between the power of the fourth filtered sample and the power of the third filtered sample;
determining whether the second value exceeds the first non-zero threshold;
determining a quantity indicating how many of the first value and the second value exceed the first non-zero threshold;
determining whether the quantity exceeds a second non-zero threshold; and detecting a burst interference signal occurrence within the radar signal based on whether the quantity exceeds the second non-zero threshold.

16. The method of claim 15, further comprising:
replacing the first sample with a first synthesized sample and replacing the second sample of the radar signal with a second synthesized sample in response to the quantity exceeding the second non-zero threshold.

17. An interference detector comprising a processor configured to:
attenuate components of a radar signal having a frequency less than a cut-off frequency to generate a first filtered sample and second filtered sample from a first sample and a second sample of the radar signal, respectively, the second sample being subsequent in time to the first sample;
determine a power of the first filtered sample and a power of the second filtered sample;
determine a first value indicating a difference between the power of the second filtered sample and the power of the first filtered sample;
determining whether the first value exceeds a first non-zero threshold; and
detecting a burst interference signal occurrence within the radar signal based on whether the first value exceeds the first non-zero threshold.

18. The interference detector of claim 17, wherein the burst interference signal occurrence is detected at the first sample when the first value exceeds the first non- zero threshold.

19. The interference detector of claim 17, wherein the power of the first filtered sample is different than a power of the first sample.

20. The interference detector of claim 17, wherein the power of the first filtered sample is approximately equal to a power of the first sample.

* * * * *